April 18, 1967 M. J. INGENITO 3,315,087

MAGNETIC PULSE COUNTER AND PULSE FORMING CIRCUIT

Filed March 22, 1963 8 Sheets-Sheet 1

INVENTOR.
MICHAEL J. INGENITO

BY

H. H. Hulsen

ATTY.

INVENTOR.
MICHAEL J. INGENITO
BY
H. H. Hulsen
ATTY.

Fig. 7

| | $B_M$ (WEBER) | $B_R$ (WEBER) | $H_M$ (AMPERE-TURNS / METER) |
|---|---|---|---|
| ORTHONIK | 1.45 | 1.35 | 40 |
| MOLYBDENUM PERMALLOY | .78 | .59 | 11 |

Fig. 8

| CORE NO. | CORE MATERIAL | RELATIVE FLUX DENSITY $\frac{B_{R_1} \text{ OR } B_{R_2}}{B_{R_1}+B_{R_2}}$ | RELATIVE CROSS SECTION AREA | RELATIVE RESIDUAL MAGNETIC FLUX $\Phi R$ | RELATIVE MAGNETIC FIELD INTENSITY $H$ | RELATIVE MEAN MAGNETIC LENGTH $L_M$ | RELATIVE TURNS $\frac{(N_1+N_2+N_3)_1}{(N_1+N_2+N_3)_2}$ | RELATIVE $\frac{H L_M}{N}$ |
|---|---|---|---|---|---|---|---|---|
| 141 | MOLYBDENUM PERMALLOY | .31 | .82 | .67 | .22 | .57 | .5 | .27 |
| 142 | ORTHONIK | .69 | .18 | .33 | .78 | .43 | .5 | .73 |

Fig. 10

| CIRCUIT COMPONENT | VALUE OR TYPE |
|---|---|
| WINDING 116 | 110 TURNS |
| WINDING 117 | 15 TURNS |
| WINDING 118 | 15 TURNS |
| WINDING 119 | 40 TURNS |
| RESISTOR 123 | 180 OHMS |
| RESISTOR 124 | 82 OHMS |
| RESISTOR 125 | 0 OHMS |
| RESISTOR 129 | 270 OHMS |
| TRANSISTOR 122 | 2N 696 TYPE |
| TRANSISTOR 128 | 2N 696 TYPE |

INVENTOR.
MICHAEL J. INGENITO
BY
H. H. Hulsen
ATTY.

INVENTOR.
MICHAEL J. INGENITO
BY
H. H. Hulsen
ATTY.

Fig. 12

| CORE NO. | CORE MATERIAL | RELATIVE FLUX DENSITY $\frac{B_{R_1} \text{ OR } B_{R_2}}{B_{R_1}+B_{R_2}}$ | RELATIVE CROSS SECTION AREA | RELATIVE RESIDUAL MAGNETIC FLUX $\phi R$ | RELATIVE MAGNETIC FIELD INTENSITY H | RELATIVE MEAN MAGNETIC LENGTH $L_M$ | RELATIVE TURNS $\frac{(N_1+N_2+N_3)_1}{(N_1+N_2+N_3)_2}$ | RELATIVE $\frac{H\ L_M}{N}$ |
|---|---|---|---|---|---|---|---|---|
| 151 | ORTHONIK | .5 | .5 | .5 | .5 | .5 | .67 | .67 |
| 152 | ORTHONIK | .5 | .5 | .5 | .5 | .5 | .33 | .33 |

Fig. 14

| CIRCUIT COMPONENT | VALUE OR TYPE |
|---|---|
| WINDING 116 (CORE 151) | 180 TURNS |
| WINDING 116 (CORE 152) | 65 TURNS |
| WINDING 117 | 8 TURNS |
| WINDING 118 | 6 TURNS |
| WINDING 119 | 40 TURNS |
| RESISTOR 123 | 180 OHMS |
| RESISTOR 124 | 82 OHMS |
| RESISTOR 125 | 0 OHMS |
| RESISTOR 129 | 270 OHMS |
| TRANSISTOR 122 | 2N 696 TYPE |
| TRANSISTOR 128 | 2N 696 TYPE |

INVENTOR.
MICHAEL J. INGENITO
BY
H. H. Hulsen
ATTY.

FIG. 16
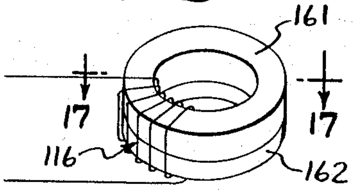
FIG. 17
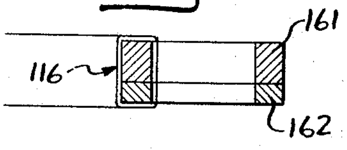
FIG. 19
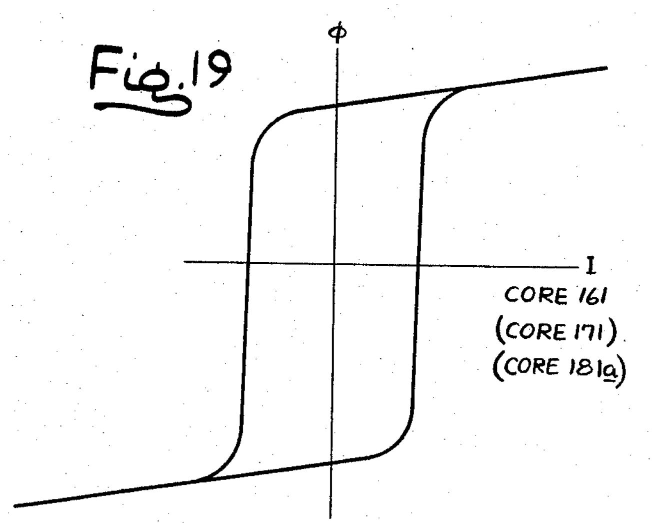
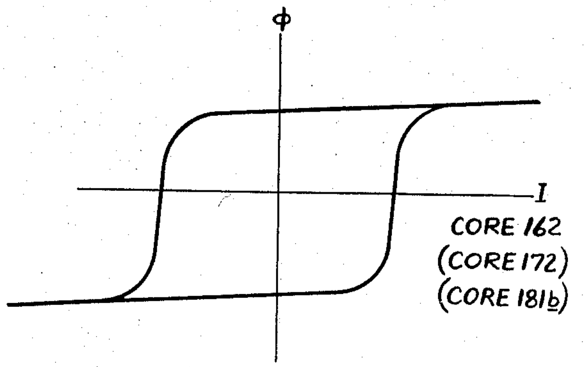
FIG. 21
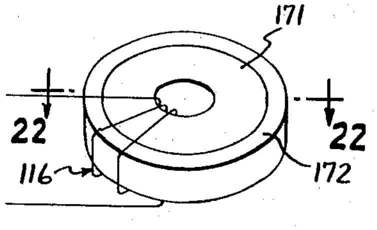
FIG. 22
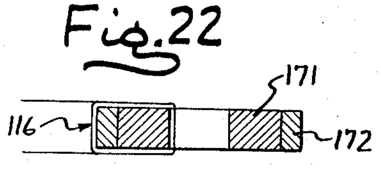
FIG. 23
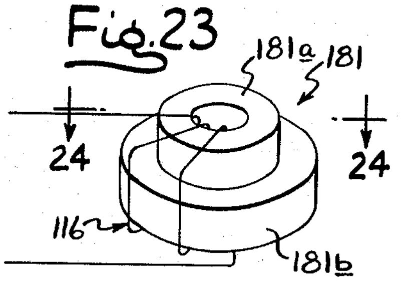
FIG. 24
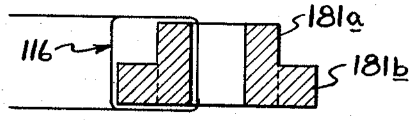
INVENTOR.
MICHAEL J. INGENITO
BY
H. H. Hulsen
ATTY.

Fig. 18

| CORE NO. | CORE MATERIAL | RELATIVE CROSS SECTION AREA | RELATIVE RESIDUAL MAGNETIC FLUX $\phi R$ | RELATIVE MAGNETIC FIELD INTENSITY H | RELATIVE MEAN MAGNETIC LENGTH $L_M$ | RELATIVE TURNS $\frac{(N_1+N_2+N_3)_1}{(N_1+N_2+N_3)_2}$ |
|---|---|---|---|---|---|---|
| 161 | ORTHONIK | .67 | .67 | .5 | .5 | .5 |
| 162 | ORTHONIK | .33 | .33 | .5 | .5 | .5 |

Fig. 20

| CIRCUIT COMPONENT | VALUE OR TYPE |
|---|---|
| WINDING 116 | 160 TURNS |
| WINDING 117 | 10 TURNS |
| WINDING 118 | 15 TURNS |
| WINDING 119 | 40 TURNS |
| RESISTOR 123 | 180 OHMS |
| RESISTOR 124 | 82 OHMS |
| RESISTOR 125 | 0 OHMS |
| RESISTOR 129 | 270 OHMS |
| TRANSISTOR 122 | 2N 696 TYPE |
| TRANSISTOR 128 | 2N 696 TYPE |

INVENTOR.
MICHAEL J. INGENITO
BY
H. H. Hulsen
ATTY.

INVENTOR.
MICHAEL J. INGENITO
BY
H. H. Hulsen
ATTY.

3,315,087

MAGNETIC PULSE COUNTER AND PULSE FORMING CIRCUIT

Michael J. Ingenito, Bronx, N.Y., assignor to General Time Corporation, New York, N.Y., a corporation of Delaware Filed Mar. 22, 1963, Ser. No. 267,273
21 Claims. (Cl. 307—88)

The present invention relates to a magnetic counter and pulse forming circuit and more specifically to a magnetic counter and pulse forming circuit having an extended counting range.

Magnetic counters have proven to be excellent substitutes for the bistable multivibrators and capacitor charging and discharging circuits sometimes employed in the prior counter art because of their simplicity and longer life. However, these magnetic counters have been quite limited in the counting range per stage, on the order of 16, and, for the larger counts, it has been necessary to use a plurality of counter stages. Therefore, it has been desirable to provide a magnetic counter with an extended counting range.

A primary object of this invention is to provide a magnetic counter having an extended counting range. In this connection, an object of this invention is to provide a magnetic counter which allows for less counting stages for a given count. Further in this connection, an object of this invention is to provide a magnetic counter which allows for directly obtaining counts which were not easily obtainable in the past, such as a 29 count.

A more general object of this invention is to provide a magnetic counter having increased flexibility and versatility.

Another object of this invention is to provide a magnetic counter utilizing a plurality of cores of magnetic sections wherein the cores or sections are saturated at different times for providing an extended counting range per stage. Accordingly, it is an object of this invention to provide a magnetic counter including a plurality of cores or sections wherein the cores or sections are switched from full magnetization in one direction to full magnetization in the opposite direction one at a time so that saturation thereof is attained at different times. Additionally, an object of this invention is to provide a magnetic counter including a plurality of cores or sections wherein the cores or sections are driven from full magnetization in one direction to full magnetization in the opposite direction at the same time, but reach the opposite saturation states a different times.

A more specific object of this invention is to provide a magnetic counter having a plurality of cores or sections wherein the width of the hysteresis loops for the cores or sections are different so that saturation of the cores may occur at different times. Another more specific object of this invention is to provide a magnetic counter having a plurality of cores or magnetic sections wherein the width of the hysteresis loops for the cores or sections are different so that saturation of the cores may occur at different times.

A further object of this invention is to provide a magnetic counter utilizing a plurality of cores constructed of different materials so that the operating temperature range of the counter is extended.

Other objects and advantages of this invention will become apparent upon reading the attached detailed description and upon reference to the drawings, in which:

FIG. 7 is a table illustrating relative magnetic characteristics of "Orthonik" and "Molybdenum Permalloy";

FIG. 8 is a table illustrating typical relative magnetic characteristics of the cores in FIG. 5;

FIG. 10 is a table illustrating typical circuit parameters for the counter in FIG. 1 when the cores in FIG. 5 are utilized therein and the counter is to be a 30 counter;

FIG. 12 is a table illustrating typical relative magnetic characteristics of the cores in FIG. 11;

FIG. 14 is a table illustrating typical circuit parameters for the counter in FIG. 1 when the cores in FIG. 11 are utilized therein and the counter is to be a 30 counter;

FIG. 16 is a semi-schematic illustration of a third embodiment of a saturable reactor core arrangement constructed in accordance with the present invention which may be utilized in the counter in FIG. 1;

FIG. 17 is a cross-sectional view of the core arrangement in FIG. 16 taken along line 17—17;

FIG. 18 is a table illustrating typical relative magnetic characteristics for the cores in FIG. 16;

FIG. 19 is a plot of typical hysteresis loops for the cores in FIG. 16;

FIG. 20 is a table illustrating typical circuit parameters for the counter in FIG. 1 when the cores in FIG. 16 are utilized therein and the counter is to be a 30 counter;

FIG. 21 is a semi-schematic illustration of a fourth embodiment of a saturable reactor core arrangement constructed in accordance with the present invention which may be utilized in the counter in FIG. 1;

FIG. 22 is a cross-sectional view of the core arrangement in FIG. 20 taken along line 22—22;

FIG. 23 is a semi-schematic illustration of a fifth embodiment of a saturable reactor core arrangement constructed in accordance with the present invention which may be utilized in the counter in FIG. 1;

FIG. 24 is a cross-sectional view of the core arrangement in FIG. 23 taken along line 24—24;

While the invention has been described in connection with certain preferred embodiments, it is to be understood that the invention is not to be limited to the disclosed embodiments but, on the contrary, the invention is intended to cover the various modifications and equivalent arrangements included within the spirit and scope of the appended claims.

Figures 1, 2, 3, 4:
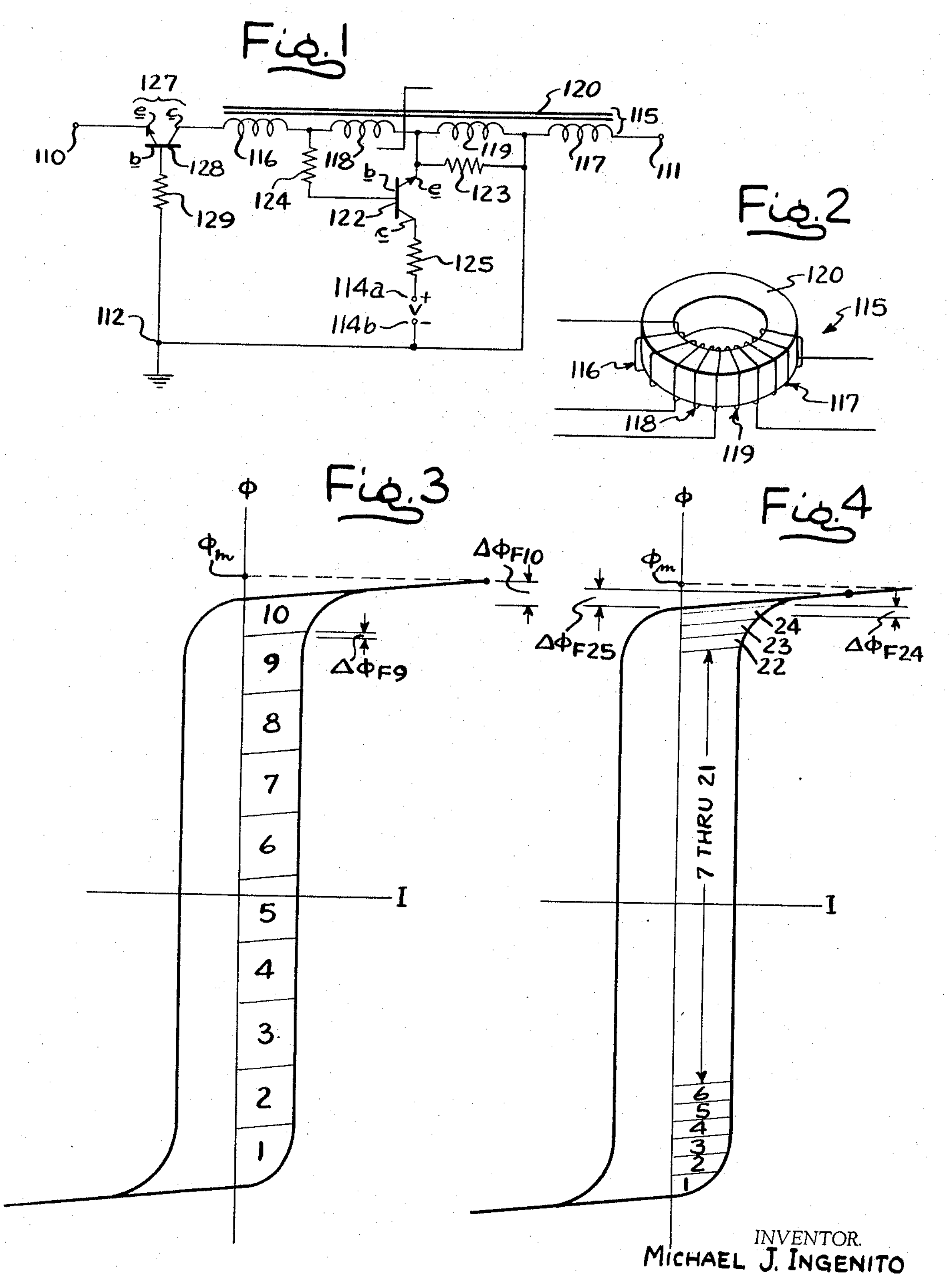
FIG. 1 is a schematic diagram of a magnetic counter.
FIG. 2 is a semi-schematic illustration of a single saturable reactor core utilized in FIG. 1.
FIG. 3 is a plot of a hysteresis loop for a single saturable reactor core utilized in FIG. 1 wherein incremental steps for a 10 count are illustrated.
FIG. 4 is a plot of a typical hystersis loop for a single saturable reactor core utilized in FIG. 1 wherein incremental steps for a 25 count are illustrated.

Referring to FIG. 1, the basic circuitry of a magnetic counter is illustrated which is commercially available under the trade name "Incremag" and is described in U.S. Patent 2,897,380, issued July 28, 1959, to C. Neitzert. The counter has an input terminal 110, an output terminal 111, and a ground terminal 112. Through leads 114*a* and 114*b* power is supplied to the counter by a positive power supply designated as V. It will be understood that, regardless of the type of power supply used, i.e. battery or rectified A.C., the leads 114*a* and 114*b* by themselves constitute a source of current to the counter, and it is in this sense that the term "source of current" is used in the claims. The heart of the counter is a saturable reactor 115 having an input winding 116, an output winding 117, a triggering winding 118 and a reset winding 119 wound on a core 120. A transistor 122 having a base, an emitter and a collector, designated as *b*, *e* and *c*, has its input circuit connected across the triggering winding 118 and has its output circuit connected in series with the reset winding 119.

A semi-detailed schematic illustration of the saturable reactor 115 is illustrated in FIG. 2 wherein the core 120 is shown with the windings 116–119 wound thereon. The windings 116–119 are illustrated in FIG. 2 as portions of a single winding, though it is to be understood that the windings 116–119 may be independently wound on the core 120.

The material of the core 120 is so chosen that, when an input pulse is applied to the input winding 116, the magnetization of the core is advanced one step from negative saturation toward the condition of positive saturation. When a predetermined number of input pulses have been applied to the input winding, as determined by the volt-second content thereof, the saturation of the core is exceeded, i.e., the core is set, and, when the last pulse is removed, the sudden collapse of the excess flux induces a voltage in the triggering winding 118 which is in a direction to initiate conduction in the transistor 122. The resulting flow of current in the reset winding 119 induces a voltage in the triggering winding 118 which causes still further current to flow through the transistor output circuit to a point where a condition of negative saturation is achieved in the core of the reactor, i.e., the core is reset. When the core is driven from a condition of positive saturation to a condition of negative saturation, an output pulse is induced in the output winding 117 which is transmitted to the output terminal 111 and, when the core has attained the negative state of saturation, the counter is conditioned to receive a new series of input pulses.

To prevent operation of the transistor 122 in response to small changes in flux which occur during each step of advancement toward saturation, a damping resistor 123 is connected in parallel with the reset winding 119. Moreover, to limit the base current of the transistor in the face of a large voltage induced in the triggering winding, a series resistor 124 is used. Additionally, there is provided in series with the collector of the transistor 122 a low value resistor 125 for the purpose of limiting the reset current, which not only tends to protect the transistor, but which also limits the load which is placed upon the power supply V. Finally, to improve the consistency of the input pulses applied to the counter, an input or buffer stage 127 is included therein which consists of a transistor 128 and an input resistor 129. The transistor 128 also has a base, an emitter and a collector, respectively designated as *b*, *e* and *c*, and is rendered conductive by the application of negative pulses to the input terminal 110 since transistor 128 is illustrated as being of the NPN type.

Though the counter in FIG. 1 has been illustrated as having an output winding 117, the output winding may be deleted and the output may be "tapped" off the emitter of transistor 122. Accordingly, the present invention is intended to cover either arrangement.

Magnetic counters of the type described above are limited in the count per stage and, therefore, for counts above the maximum count per stage a plurality of such counters must be cascaded. In actual practice, it has been found that such counters are limited to a maximum count per stage of approximately sixteen. Additionally, with such counters, certain counts are not readily obtainable. For example, to obtain a twenty-nine count, one would have to cascade a 10 counter and a 3 counter, and then would have to introduce additional circuitry to subtract one therefrom. The reason for the limitation in the count per stage of these magnetic counters may be seen by reference to FIGS. 2 and 3.

Referring to FIG. 3, a substantially rectangular hysteresis loop is illustrated which corresponds to the hysteresis loop for the materials utilized in the core of the counter illustrated in FIG. 1, such material being commercially sold by G. L. Electronics Company under the name "Orthonik" type P1040. The hysteresis loop has been broken up into ten segments, numbered 1–10, which depict the incremental steps of driving the core from negative saturation to positive saturation when the counter in FIG. 1 is utilized as a "10" counter. The above-described counter may be successfully utilized for a count, such as ten, since the collapse in flux after the termination of any intermediate input pulse, i.e., the fly-back flux, is much smaller than the collapse in flux after the final pulse of a count, the collapse in flux for the ninth and tenth pulses in FIG. 3 being respectively designated as $\Delta\phi F9$ and $\Delta\phi F10$. Thus, as may be seen by reference to FIG. 3, $\Delta\phi F10$ is much greater than $\Delta\phi F9$. The reset circuitry of the counter in FIG. 1 is so designed that the transistor 122 is triggered to conduction in response to the collapse in flux $\Delta\phi F10$ but is not triggered to conduction by the collapse in flux $\Delta\phi F9$, the collapse in flux $\Delta\phi F9$ having insufficient amplitude to induce such triggering. As previously set forth with respect to FIG. 1, when the transistor 122 is triggered to conduction by the collapse in flux after the last pulse of a predetermined count, the core is driven back to the negative state of saturation and is conditioned for a subsequent counting cycle.

Referring to FIG. 4, a substantially rectangular hysteresis loop is also illustrated which is identical to the hysteresis loop illustrated in FIG. 3. However, the hysteresis loop in FIG. 4 is broken up into twenty-five segments, numbered 1–25, which depict the incremental changes in magnetization of the core when the counter in FIG. 1 is utilized as a "25" counter. Because the incremental changes are so small, the twenty-fifth input pulse can not drive the core to the maximum state of magnetic flux designated as $\phi_m$, but only is capable of driving the core to a state of magnetic flux some value less than the maximum value. Additionally, the fly-back flux or the collapse in flux after the next to last input pulse, designated as $\Delta\phi F24$, is appreciable when compared with the fly-back flux after the twenty-fifth input pulse, designated as $\Delta\phi F25$. For these two reasons, the difference between the fly-back flux $\Delta\phi F24$ and the fly-back flux $\Delta\phi F25$ is now very small. The reset circuit of the counter illustrated in FIG. 1 may be designed to be rather sensitive and it might distinguish between $\Delta\phi F24$ and $\Delta\phi F25$. However, if just a few of the effects of supply voltage and temperature variations are taken into consideration, it will be seen that it becomes extremely difficult for the reset circuit to distinguish between these fly-back fluxes. Further along these lines, if the reset circuit is not rendered operative in response to the twenty-fifth input pulse, the core will be driven to or closer to the maximum magnetic flux $\phi_m$ by the twenty-sixth input pulse and the reset circuit may be rendered operative in response to the fly-back flux produced upon termination of the twenty-sixth pulse. The fly-back flux induced by the twenty-sixth pulse would be comparable in amplitude to the fly-back fluxes induced by the twenty-fourth and twenty-fifth pulses and therefore, under such circumstances, the reset circuit would have trouble distinguishing between these three fly-back fluxes. Accordingly, it may be seen that as the desired count rises, it becomes extremely difficult for the above-described counter to be stable and accurate, a count of approximately sixteen having been found to be the limit for stable and accurate operation.

In accordance with the present invention, means are provided for extending the counting range and, in some instances, for extending the temperature operating range of the magnetic counter illustrated in FIG. 1. More specifically, a saturable reactor arrangement is substituted for the saturable reactor described hereinabove with respect to FIG. 1 which has at least to sections or is formed of at least two separate cores constructed of materials having generally rectangular hysteresis loops. As used in the specification and in the claims, the term "section" or "reactor section" denotes either the core of a reactor, including the reactor windings which link the core, or the core alone, without windings. Thus, the term "section" or "reactor section" as used herein is broader than the term "core," but may in some instances be used interchangeably with it to denote the core of a reactor. The cores or sections may have unlike physical dimensions or may be formed of materials having unlike characteristics to so proportion the ampere-turns required to establish a given flux completely around one of the sections or cores relative to the corresponding parameter of the other section or core so that one section or core is driven from a first saturation state to substantially a second saturation state by input pulses before the input pulses so affect the other section or core. With this modified arrangement, the total count of the counter is the summation of the number of input pulses required to cause all the sections or cores to be driven to the second saturation state. This switching action from one saturation state to the opposite saturation state may be accomplished in many ways. Two ways, for example, are (1) the switching of the cores or sections one at a time and (2) the switching of the cores or sections simultaneously but such that they reach the opposite saturation states at different times.

Figure 5:
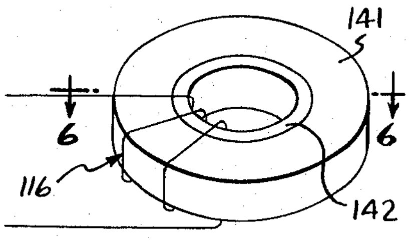
FIG. 5 is a semi-schematic illustration of a first embodiment of a saturable reactor core arrangement constructed in accordance with the present invention which may be utilized in the counter of FIG. 1.
Figure 6:
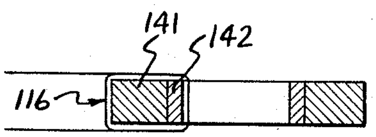
FIG. 6 is a cross-sectional view of the core arrangement in FIG. 5 taken along line 6—6.

Referring to FIGS. 5 and 6, a first embodiment of the modified saturable reactor arrangement is illustrated, wherein two magnetic cores 141 and 142 are utilized, with only the input winding 116 being shown wound thereon such that the same number of turns are associated with both cores. The modified saturable reactor arrangement is constructed in the same manner as the single core arrangement illustrated in FIG. 2 except for the fact that the windings 116–119 are wound on two cores rather than on a single core. Accordingly, though windings 117–119 are not illustrated in FIG. 5, it is to be understood that they are wound about both cores 141 and 142 so that the same number of turns are associated with each core. The cores 141 and 142 are illustrated as having different mean magnetic lengths, since one core is positioned within the other core, and as having different cross-sectional areas as may be seen by reference to FIG. 6. Additionally, the cores may be constructed of different magnetic materials. For example, core 141 may be constructed of "Molybdenum Permalloy" and the core 142 may be constructed of "Orthonik," these materials being sold commercially by the G. L. Electronics Company.

As is well known, the magnetic field intensity required to switch the magnetic state of a magnetic core is equal to ampere-turns divided by the unit length along the path of flux. This may be set forth by the equation $$H=\frac{NI}{l}$$

wherein H is the magnetic field intensity in ampere-turns per meter, N is the number of input turns linking the core, I is the current flowing through the turns in amperes, and $l$ is the unit length along the path of the flux in meters. If the above equation is multiplied by the mean magnetic length $L_m$ of the core, the equation will then read $$HL_m=\frac{NIL_m}{l}$$

This equation now sets forth the ampere-turns required to establish a given flux completely around a core having a mean magnetic length equal to $L_m$. Accordingly, if a hysteresis loop of flux versus current is plotted, it may be seen from this equation that the width of the hysteresis loop for a core is directly proportional to the mean magnetic length thereof and the width may be varied by varying the mean magnetic length. Additionally, the inductance of a core is proportional to the cross-sectional area thereof, and the slope and width of the hysteresis loop for a core reflects the inductance of the core, the width decreasing as the inductance increases. Thus, the width of the hysteresis loop for a core may be varied by varying the cross-sectional area thereof. In view of the foregoing, the hysteresis loops for the two cores 141 and 142 illustrated in FIG. 5 will have different widths since the cores have different mean magnetic lengths and different cross-sectional areas, this reflecting different inductances therefor.

Additionally, if it is assumed that the materials of the cores 141 and 142 are respectively Molybdenum Permalloy and Orthonik, the widths and heights of the hysteresis loops will be further modified. Referring to FIG. 7, a table is illustrated which sets forth the approximate magnetic characteristic relationships for Molybdenum Permalloy and Orthonik between (1) the value flux density when the material is completely magnetized, (2) the maximum flux density at zero magnetic field intensity, i.e., the residual flux density, and (3) the magnetic field intensity. As may be seen by reference to the table, the values for Orthonik are substantially greater than the values for Molybdenum Permalloy. Thus, if a hysteresis loop were plotted for these two materials, it would be found that the hysteresis loop for Orthonik would be approximately four times as wide as the hysteresis loop for Molybdenum Permalloy because of the approximate 4:1 ratio in magnetic field intensity and it would be found that the hysteresis loop for Orthonik would be approximately twice as high as the hysteresis loop for Molybdenum Permalloy because of the approximtae 2:1 ratio between maximum flux densities and residual flux densities, these relationships existing for cores having the same cross-sectional areas.

Figure 9:
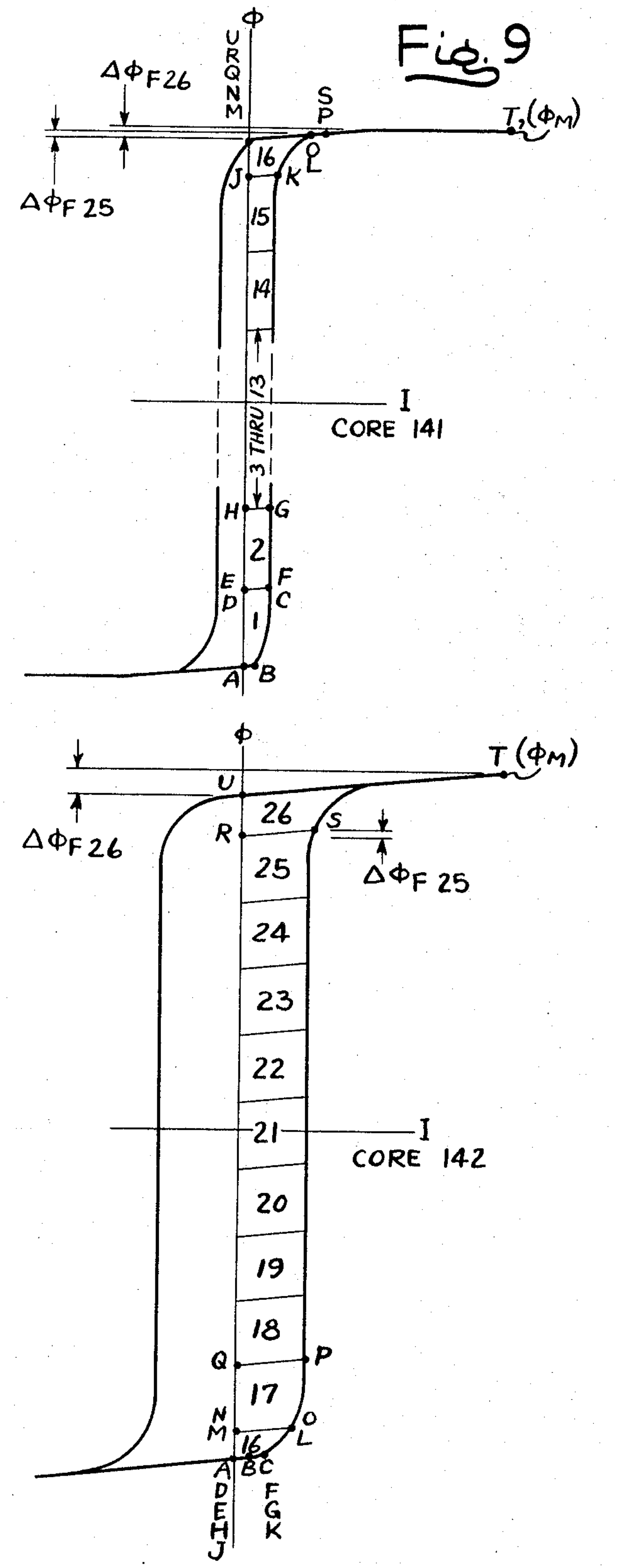
FIG. 9 is a plot of typical hysteresis loops for the cores in FIG. 5 wherein incremental steps for a 26 count are illustrated.

Relative magnetic characteristics for the two cores illustrated in FIG. 5, when constructed of the above-mentioned materials, are set forth in the table illustrated in FIG. 8 and hysteresis loops for the two cores are illustrated in FIG. 9 wherein flux $\phi$ is plotted against input current I. Though the hysteresis loops in FIG. 9 are illustrated as having the same heights, the vertical scale for the hysteresis loop for core 141 is intended to be approximately twice that for core 142 so that the hysteresis loop for core 141 is actually approximately twice the height of the hysteresis loop for core 142.

Let it be assumed that the cores illustrated in FIG. 5 have the above-described characteristics and are substituted in the counter of FIG. 1 and that it is desired that the counter be a "26" counter. The twenty-six input pulses provided at the input terminal 110 and applied to the input winding 116 will cause the cores 141 and 142 to be magnetically switched, as shown in FIG. 9, the hysteresis loops being broken up into segments numbered 1–26 which depict the incremental steps in driving the cores from negative to positive saturation in response to twenty-six input pulses. For example, the first input pulse causes the flux level of both cores to be moved from points A to points B and C. When the first input pulse is removed, the flux in both cores relaxes or collapses to point D. Thus, it may be seen that a net flux change takes place in core 141 and a zero net flux change takes place in core 142. The second input pulse causes the cores 141 and 142 to be driven from points E to points F and G and, upon termination thereof, the flux in both cores relaxes to point H. Points F and G are the same point for core 142 so that the flux thereof "stalls" at this point until the input pulse is terminated. Again, it may be seen that a net flux change takes place in core 141 and a zero net flux change takes place in core 142. The third through the fifteenth input pulses cause the same type of cycle as the second input pulse and, during this time, the core 141 is driven from the negative state of saturation towards the positive state of saturation in incremental steps, as illustrated, whereas core 142 remains at the negative residual state of flux. The sixteenth input pulse causes both cores to be driven from point J to points K and L and, upon termination thereof, the flux in the cores relaxes to point M. As may be seen, a net flux change takes place in both cores 141 and 142 in response to the sixteenth input pulse. The seventeenth input pulse causes cores 141 and 142 to be driven from point N to points O and P. Upon an inspection of the hysteresis loop for core 141, it may be seen that points O and P are essentially the same so that core 141 "stalls" at this point. Upon termination of the seventeenth input inpulse, both cores relax to point Q. As may be seen by reference to the hysteresis loops, a zero net flux change occurs for core 141, whereas a substantial net flux change occurs for core 142. The eighteenth to the twenty-fifth input pulses cause the same type of cycle as the seventeenth input pulse. The twenty-sixth input pulse moves both cores from point R to points S and T whereat the maximum magnetic flux $\phi_m$ is reached. Upon termination of the twenty-sixth input pulse, the cores relax to point U. The summation of the fly-back fluxes or collapse in fluxes $\Delta\phi F26$ is sufficient to trigger the reset circuit of the counter so that both cores are driven back to the negative states of saturation and relax to the states of negative residual magnetic flux, indicated at point A.

A brief description of the theory may be helpful in understanding why the counter illustrated in FIG. 1 operates in this manner with the saturable reactor arrangement illustrated in FIG. 5. The input impedance of a device of this type or the input current applied to the input winding on a magnetic core is primarily determined by the slope of the hysteresis loop of the core. In essence, with the arrangement illustrated in FIG. 5, the input portion of the counter appears as two series connected inductors having values determined by the hysteresis loops of the two cores 141 and 142 and the input voltage applied thereto divides in direct proportion to the respective inductances. When the first input pulse is applied to the input winding 116, both cores move quickly from points A to points B in FIG. 9 and then proceed to points C. At the time the flux level of the core 141 begins its vertical ascent, the inductance of the portion of the input winding associated with core 141 becomes much higher than the inductance of the portion associated with core 142. Since the voltage applied to the two series connected inductors divides in a direct proportion to the respective inductances, the portion of the applied voltage associated with core 142 quickly becomes very small and essentially the entire applied voltage is associated with core 141. For this reason, core 142 shows an extremely small flux change and core 141 shows a relatively large flux change in going from points A to points C. At the termination of the first input pulse, the flux in both cores relaxes to points D so that core 141 shows a net flux change and core 142 shows a zero net flux change.

The same type of cycle as set forth above repeats itself until core 141 approaches positive saturation. In response to the sixteenth input pulse, the flux level of core 141 begins to "round off," i.e., level off in the horizontal direction, and the inductance of the portion of the input winding associated therewith decreases. Therefore, a larger portion of the applied voltage is associated with core 142 so that a flux change begins to take place therein. Toward the end of the sixteenth input pulse, the flux level of core 141 reaches essentially the horizontal portion thereof so that the inductance of the input winding portion associated therewith drops to a very low value. During this time, the flux level of core 142 begins its vertical ascent so that the input winding portion associated therewith presents a much higher impedance and, therefore, practically all of the applied voltage is associated with core 142. At the termination of this input pulse, the flux in both cores relaxes to point M so that a net flux change occurs in both cores. Subsequently, essentially all of the applied voltage is associated with core 142 so that from the seventeenth to the twenty-fifth input pulses a net flux change occurs in core 142, whereas a zero net flux change occurs in core 141. When the twenty-sixth input pulse is applied, both cores are at point R. Since the flux level of core 141 is in the low inductance portion of the hysteresis loop, practically all of the applied voltage will be associated with core 142 which will cause the flux level of core 142 to be driven into the "rounded" portion of the hysteresis loop to point T, i.e., the flux level of core 142 levels off in the horizontal direction. Core 141 is also driven to point T since the inductance of the input winding portion associated with core 142 is dropping as the flux level is driven into the "rounded" portion and the inductances of the winding portions associated with the cores become substantially the same. At the termination of the twenty-sixth input pulse, the flux in both cores relaxes toward point U.

As may be seen by reference to FIG. 9, the summation of the fly-back fluxes $\Delta\phi F26$ provided at the termination of the twenty-sixth pulse is much greater than the summation of the fly-back fluxes $\Delta\phi F25$ at the termination of the twenty-fifth pulse so that the reset circuit of the counter can easily distinguish therebetween, the reset circuit being triggered in response to the termination of the twenty-sixth input pulse so that both cores are returned to point A. Thus, it may be seen that, with the two cores, the combined fly-back fluxes after the last input pulse of a desired count is much greater than the combined fly-back fluxes with the previous input pulses and that both cores are driven to the point of maximum magnetic flux $\phi_m$. Accordingly, a stable and accurate counter is provided for a much larger count than was previously obtainable with a magnetic counter since the reset circuit can readily distinguish between the fly-back fluxes. Additionally, it may be seen that if a greater plurality of cores are utilized, an even greater count may be obtained.

Referring to FIG. 10, a table is illustrated which sets forth the circuit parameters of FIG. 1 for a "30" counter utilizing the saturable reactor arrangement illustrated in FIG. 5.

Figure 11:
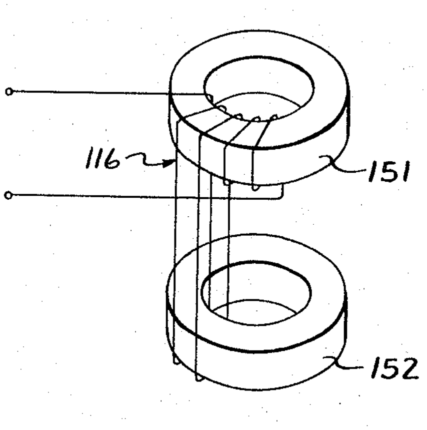
FIG. 11 is a semi-schematic illustration of a second embodiment of a saturable reactor core arrangement constructed in accordance with the present invention which may be utilized in the counter of FIG. 1.

In accordance with another aspect of the invention, a second embodiment of the means which may be substituted in the counter of FIG. 1 to allow for an extended counting range is illustrated in FIG. 11. A pair of identical cores 151 and 152 are illustrated in FIG. 11 which may be substituted in FIG. 1 for the single core 120 illustrated in FIG. 2. Additionally, the input winding 116 is so wound about the cores 151 and 152 that twice as many turns are associated with the core 151 as are associated with the core 152. The windings 117–119 are not illustrated in FIG. 11. However, these windings will be wound on both cores 151 and 152 in the same manner as on core 120 in FIG. 2 so that the same number of turns are associated with both cores.

Figure 13:
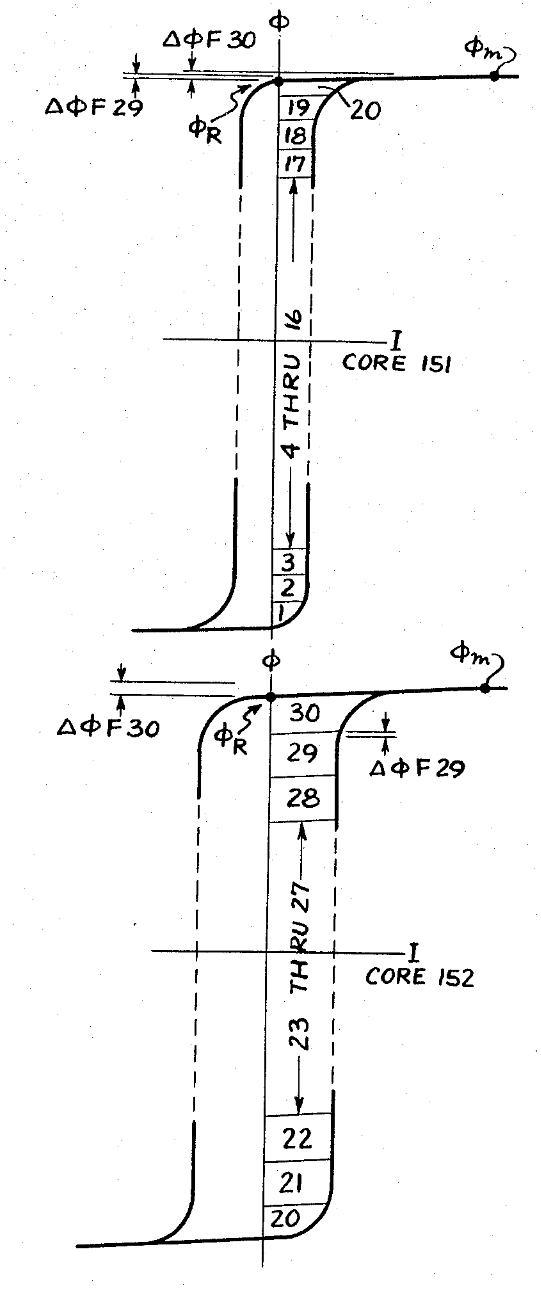
FIG. 13 is a plot of typical hysteresis loops for the cores in FIG. 11 wherein incremental steps for a 30 count are illustrated.

For this embodiment, let it be assumed that both cores are constructed of "Orthonik." Referring to FIG. 12, a table is illustrated which sets forth relationships between magnetic characteristics of the two cores under the above-described circumstances. With these conditions existing, the hysteresis loops for the cores 151 and 152 will be as illustrated in FIG. 13. Since the cores per se are identical in their structure and makeup, the heights of the hysteresis loops are the same. However, since a greater number of input winding turns are associated with core 151, the width of the hysteresis loop therefor is less than the width of the hysteresis loop for core 152. In the illustrated example, it has been assumed that the number of input winding turns wound on the core 151 is twice as great as the number of turns wound on the core 152. Accordingly, the hysteresis loop for core 151 is approximately one-half the width of the hysteresis loop for the core 152.

The theory of operation for the counter modified in accordance with the two core saturable reactor arrangement illustrated in FIG. 11 is similar to the operation of the counter when modified in accordance with the two core arrangement illustrated in FIG. 5. For a brief discussion of the operation, let it be assumed that the modified counter is to be a "30" counter. Accordingly, the core 151 will be driven from the negative state of saturation to the positive state of saturation in incremental steps in response to the first twenty input pulses, the flux level of core 151 being in the high inductance portion of the hysteresis loop and the flux level of core 152 being in the low inductance portion of the hysteresis loop during the application of the first nineteen input pulses so that little or no effect is had on the core 152. In response to the twentieth input pulse, the flux level of core 151 moves into the low inductance portion and the flux level of core 152 moves into the high inductance portion so that subsequent pulses up to the thirtieth input pulse effect only the core 152. In response to the thirtieth input pulse, both cores are driven to the state of maximum magnetic flux $\phi_m$ and, upon termination thereof, the flux in both cores relaxes or collapses to the state of residual magnetic flux. As may be readily seen by reference to FIG. 13, the cumulative effect of the fly-back or collapsing fluxes $\Delta\phi F30$ in response to termination of the thirtieth input pulse is substantially greater than the cumulation of fly-back fluxes in response to the termination of the previous input pulses, the fly-back fluxes $\Delta\phi F29$ being illustrated, and the reset circuit is rendered operative in response to the fly-back flux at the termination of the thirtieth input pulse so that the cores are both driven back to the negative state of saturation and relax to the negative residual state of magnetic flux.

As may be further seen by reference to FIG. 13, the incremental steps between negative and positive saturation for the two cores are different in size. More specifically, the incremental steps for the core 152 are approximately twice the magnitude of the incremental steps for the core 151. This phenomena exists since, as is well known to those skilled in the art, the magnitude of the incremental steps is inversely proportional to the number of turns effectively linking the core. Accordingly, since the cores are identical and twice as many turns are associated with core 151 than with core 152, the incremental steps for core 152 are essentially twice the incremental steps for core 151. Thus, the number of turns and accordingly the relative widths of the two loops may be set at any desired ratio so that any desired cumulative count may be provided by the cores.

Figure 15:
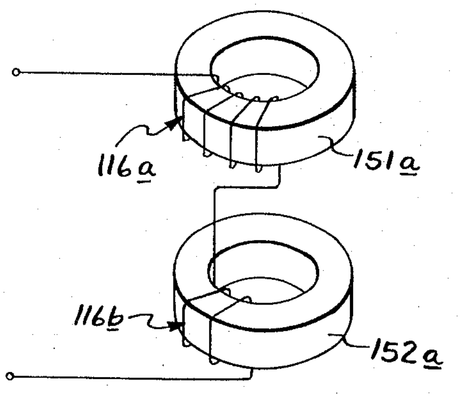
FIG. 15 is a semi-schematic illustration of a modification of the core arrangement in FIG. 11.

Though the operation of the counter has been set forth with only two cores 151 and 152 being substituted in the circuit of FIG. 1, it is to be understood that a greater plurality of cores could be utilized having different numbers of input winding turns associated therewith so that a counter having even a greater count could be provided. Additionally, though the windings in FIG. 11 are illustrated as being part of a continuous loop, the input winding 116 may be independently wound on the two cores 151 and 152 so that essentially two input windings would be provided which are connected in series. This latter relationship is illustrated in FIG. 15 wherein the input winding is first wound about core **151*a* and is then wound about core 152*a* so that a pair of series connected windings 116*a* and 116*b* are provided. With this arrangement, the counter in FIG. 1 will operate in an identical manner to the above-described operation for the arrangement in FIG. 11 since the hysteresis loops for cores 151*a* and 151*b* will be related as the hysteresis loops for cores 151 and 152** illustrated in FIG. 13.

Referring to FIG. 14, a table is illustrated which sets forth the circuit parameters when the counter circuit illustrated in FIG. 1 is utilized as a "30" counter and the core arrangement in FIG. 11 or the core arrangement illustrated in FIG. 15 is substituted therein.

Further in accordance with the invention, a third embodiment of means which may be substituted in the counter circuit of FIG. 1 to allow for an extended counting range is illustrated in FIG. 16. In this embodiment, a pair of cores 161 and 162 are provided which are substituted for the single core in FIG. 1. The cores 161 and 162 are identical except for the fact that they have different cross-sectional areas, as may readily be seen by reference to FIG. 17. Only the input winding 116 is illustrated in FIG. 16. However, windings 117–119 will be as illustrated in FIG. 2 except they will be wound on both the cores 161 and 162 rather than on the single core 120.

For this example, let it be assumed again that both cores are constructed of "Orthonik." Referring to FIG. 18, a table is illustrated which sets forth magnetic characteristics of the two cores 161 and 162 under these circumstances, wherein the cross-sectional area of core 161 is assumed to be approximately twice the cross-sectional area of core 162. The inductance of a core is proportional to the cross-sectional area and the input current to the input winding on a core decreases with an increase in inductance as the impressed voltage is maintained constant. Therefore, if we substitute the above-described two cores 161 and 162 illustrated in FIG. 16 in the counter illustrated in FIG. 1, the individual hysteresis loops for the cores will be as illustrated in FIG. 19. Since the core 161 has a higher inductance due to its greater cross-sectional area, a larger portion of the voltage of the input pulses is initially applied thereto and, therefore, the flux level of core 161 starts its vertical ascent before the flux level of core 162 begins its vertical ascent. The operation of the counter utilizing cores 161 and 162 is similar to that described hereinabove with respect to the modifications of the counter in accordance with the teachings of FIGS. 5 and 11. Therefore, the operation will not be described for cores 161 and 162. Suffice it to say that core 161 will be substantially driven from its negative state of saturation to its positive state of saturation before input pulses have a similar effect on the core 162. In response to the last input pulse in a desired count, both cores will be driven to the maximum state of magnetic flux $\phi_m$ and, upon termination thereof, the flux in both cores will collapse to the residual states of magnetic flux. The cumulative fly-back flux in response to termination of the last input pulse is substantially greater than that for the previous input pulses and is sufficient to induce operation of the reset circuit so that both cores are driven back to the negative states of saturation.

Though this embodiment, as well as the previously described embodiments, has been set forth with only two cores, it is to be understood that a greater plurality of cores having different cross-sectional areas may be utilized so as to allow for an even greater count.

Referring to FIG. 20, a table is illustrated which sets forth the circuit parameters of the counter in FIG. 1 when the counter is utilized as a "30" counter and the cores illustrated in FIG. 16 are substituted therein.

A fourth embodiment of the present invention is illustrated in FIG. 21 wherein a pair of cores 171 and 172 are provided which may be substituted for the single core 120 in the counter of FIG. 1. As with the prior embodiments, only the input winding 116 is shown wound about the core arrangement in FIG. 21, though windings 117–119 are to be wound about cores 171 and 172 in the same manner as they are wound on core 120 in FIG. 2. In this embodiment, the cores 171 and 172 have different magnetic lengths since one core is positioned within the other core and have different cross-sectional areas as may be seen by reference to FIG. 22.

Again, for example, let it be assumed that both cores 171 and 172 are constructed of "Orthonik." Under these circumstances and in view of the foregoing description of the effect of different mean magnetic lengths and different cross-sectional areas on hysteresis loops, the hysteresis loops for cores 171 and 172 will be related in a similar manner as the hysteresis loops for cores 161 and 162 illustrated in FIG. 19. Accordingly, the counter in FIG. 1 will operate in a similar manner to the above-described operation for the core arrangement illustrated in FIG. 16 when the core arrangement illustrated in FIG. 21 is substituted therein and, therefore, the details of the counter operation will not be set forth. Suffice it to say that core 171 will be substantially driven from its negative state of saturation to its positive state of saturation before input pulses have a similar effect on core 172 and then core 172 will be driven from its negative state of saturation to its positive state of saturation. In response to the last input pulse in a desired count, both cores are driven to the maximum state of magnetic flux $\phi_m$ and, upon termination thereof, the reset circuit will be rendered operative and both cores will be driven back to the negative states of saturation.

A fifth embodiment of the invention is illustrated in FIG. 23 wherein a single core 181 is provided having two sections **181*a* and 181*b* with different cross-sectional areas, i.e., a single core is provided having a step-like cross-section. Additionally, since one section is within the other, the cores 181*a* and 181*b* will have different mean magnetic lengths. Again, only the input winding 116 is shown wound thereon, though in actual practice windings 117–119 will be wound thereon in a similar manner as wound on core 120 in FIG. 2. The stepped relationship between sections 181*a* and 181*b* may be readily seen by reference to FIG. 24 which shows a cross-sectional view of FIG. 23. The hysteresis loop relationship for sections 181*a* and 181*b* is also similar to that described hereinabove for the core arrangement of cores 161 and 162** illustrated in FIG. 19 and, likewise, the operation of the counter with this core arrangement will also be similar. Consequently, the operation of the counter with this core arrangement will not be set forth, but rather reference may be made to the operation of the counter with the core arrangement illustrated in FIG. 16.

Figure 25:
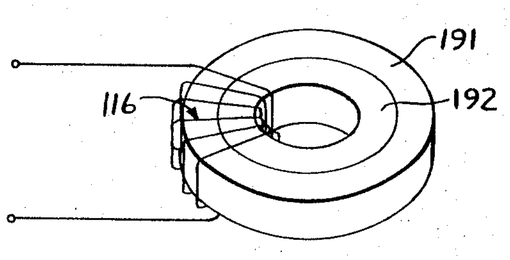
FIG. 25 is a semi-schematic illustration of a sixth embodiment of a saturable reactor core arrangement constructed in accordance with the present invention which may be utilized in the counter in FIG. 1.
Figure 27:
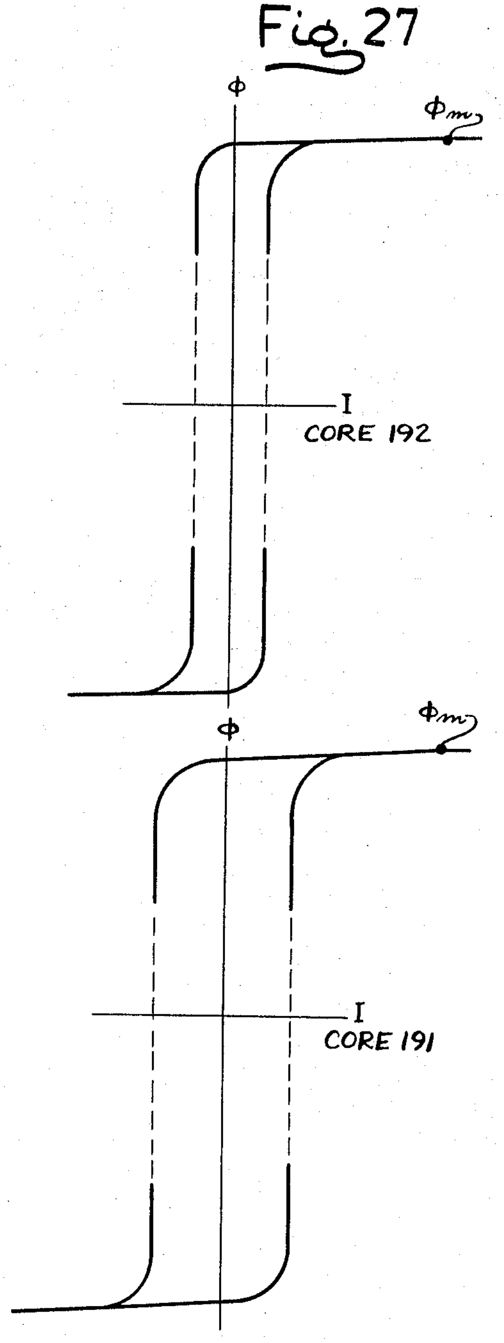
FIG. 27 is a plot of typical hysteresis loops for the cores in FIG. 25.

Still further in accordance with the present invention, a sixth embodiment of a saturable reactor core arrangement is provided as illustrated in FIG. 25 wherein a pair of cores 191 and 192 are illustrated. Since core 192 is positioned within core 191, it may be readily seen that core 191 has a greater mean magnetic length than core 192. As was previously set forth, the width of the hysteresis loop for a core is directly proportional to the mean magnetic length thereof and, accordingly, the width of the hysteresis loop for core 191 will be greater than the width of the hysteresis loop for core 192. If it is assumed that cores 191 and 192 are constructed of the same material, for instance "Orthonik" and that cores 191 and 192 have the same cross-sectional areas, then the hysteresis loops for cores 191 and 192 will have the same heights and will only differ in widths. In view of the foregoing, the hystersis loops for the cores 191 and 192 will take the form illustrated in FIG. 27 wherein the width of the hysteresis loop for core 191 is illustrated as being greater than the width of the hysteresis loop for core 192.

If the core arrangement illustrated in FIG. 25 is substituted in the counter of FIG. 1 for the core 120, the counter will operate in a similar manner as set forth hereinabove with respect to the core arrangements illustrated in FIGS. 5 and 11. Accordingly, the details of the operation will not be set forth herein but rather reference may be made to the above-described operations for the counter with the core arrangements of FIGS. 5 and 11.

Figure 26:
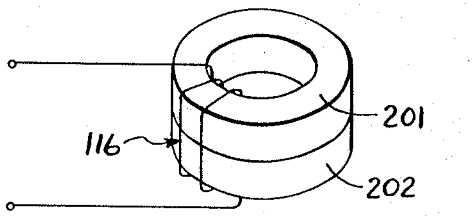
FIG. 26 is a semi-schematic illustration of a seventh embodiment of a saturable reactor core arrangement constructed in accordance with the present invention which may be utilized in the counter in FIG. 1.

Finally, in accordance with the present invention, a seventh embodiment of a core arrangement is provided which is illustrated in FIG. 26. In this arrangement, a pair of cores 201 and 202 are provided which are identical except it will be assumed that the cores are respectively constructed of Molybdenum Permalloy and Orthonik. In this arrangement, as in the previous arrangements, only the input winding 116 is illustrated and the input winding is illustrated as having the same number of turns associated with both cores 201 and 202. As previously set forth hereinabove, when the hysteresis loop for Orthonik is compared with the hysteresis loop for Molybdenum Permalloy, it will be found that the hysteresis loop for Orthonik is substantially wider and substantially higher than the hysteresis loop for Molybdenum Permalloy. Accordingly, if the core arrangement illustrated in FIG. 26 is substituted in the counter of FIG. 1 for the core 120, the counter will again operate in a similar manner as described hereinabove with respect to the core arrangements illustrated in FIGS. 5 and 11, reference being made thereto for the detailed operation of the counter with the core arrangement of FIG. 26.

In the course of investigation, it has been found that, when different materials are utilized in the multiple cores used in the magnetic counter as disclosed hereinabove with respect to FIGS. 5 and 26, the counter has an extended temperature operating range. When the material "Orthonik" is utilized for a core, the squareness ratio of the hysteresis loop therefor decreases with an increase in temperature and the count thereof increases with an increase in temperature. Conversely, when the material "Molybdenum Permalloy" is utilized for a core, the squareness ratio of the core increases with increasing temperature and the count thereof decreases with increasing temperature. Accordingly, if cores constructed of these two materials are combined in a magnetic counter, the effects thereof in response to changes in temperature will cancel one another over an extended temperature range such that the counter will remain stable and accurate over an extended temperature range. More specifically, it has been found by experimentation that if the counter illustrated in FIG. 1 is modified in accordance with the cores set forth in FIGS. 5 and 26 having different magnetic material, i.e., "Orthonik" and "Molybdenum Permalloy," the counter will be stable and accurate for a temperature well over 100° C. whereas, when cores of a single material are utilized, the counter operation is stable and accurate only for temperatures in the range of 60° C.

It should be noted that any of the above-described embodiments may be combined in a practical design to allow for an extended counting range or temperature range and the appended claims are intended to cover any such combinations. Additionally, the terms "negative saturation" and "positive saturation" as set forth in the claims are intended to indicate relative states of saturation, i.e., merely to indicate opposite saturation states and, accordingly, the claims are not intended to be limited to the specific relationship of saturation states specified.

I claim as my invention:

1. In a magnetic counting and pulse forming circuit having an input whereat input pulses are applied and an output, the combination which comprises, a pair of saturable reactor sections constructed of materials having generally rectangular hysteresis loops and having a saturating winding and a reset winding, the ampere-turns required to establish a given flux completely around one of the sections being so proportioned relative to the corresponding parameter of the other section that said section is driven in successive steps from the negative saturation substantially to positive saturation by the input pulses before the input pulses so affect the other section, means coupled to the reset winding and rendered operative upon both sections attaining positive saturation states for applying a reset pulse to the reset winding to drive the sections back to their negative saturation states, and means responsive to the resetting of said sections for producing a pulse at the output indicative of a desired count.

2. In a magnetic counting and pulse forming circuit having an input whereat input pulses are applied and an output, the combination which comprises, a pair of saturable reactor sections constructed of materials having generally rectangular hysteresis loops and having a saturating winding and a reset winding, the ampere-turns required to establish a given flux completely around one of the sections being so proportioned relative to the corresponding parameter of the other section that said one section is driven is successive steps from negative saturation substantially to positive saturation by the input pulses before the input pulses so affect the other section, resetting means including a transistor connected to the reset winding and rendered operative upon both sections attaining positive saturation states for applying a reset pulse to the reset winding to cause the sections to be driven back to their negative saturation states, and means responsive to the resetting of said sections for producing a pulse at the output indicative of a desired count.

3. In a magnetic counting and pulse forming circuit having an input for receiving input pulses and having an output, the combination which comprises, a plurality of saturable reactor sections having saturating winding means and reset winding means, a source of current, switching means interposed between the input and the saturating winding means for applying a current pulse of predetermined volt-second energy content to the reactor sections upon receipt of each of the input pulses, said reactor sections each being constructed of material having a substantially rectangular hysteresis loop but having unlike magnetic characteristics which are so proportioned that one of said reactor sections is driven by said current pulses in successive steps from negative saturation toward positive saturation through several intermediate magnetization states only after the other reactor section has been so driven by said current pulses, means including a switch connected to the source of current and responsive to the achieving of a condition of saturation in all of said core sections for applying current to the reset winding means to cause the core sections to be driven back to negative saturation in readiness for receipt of a new series of input pulses and for simultaneously applying a pulse to said output indicating that a predetermined number of input pulses have been registered.

4. In a magnetic counting and pulse forming circuit having an input for receiving input pulses and having an output, the combination which comprises, a pair of saturable reactor sections having saturating winding means and reset winding means, a source of current, switching means interposed between the input and the saturating winding means for applying a current pulse of predetermined volt-second energy content to the reactor sections upon receipt of each of the input pulses, said reactor sections each being constructed of material having a substantially rectangular hysteresis loop with the sections having unlike magnetic characteristic so proportioned that one of said reactor sections is driven by said current pulses in successive steps from negative saturation toward positive saturation through several intermediate magnetization states only after the other reactor section has been so driven by said current pulses, means including a switch connected to the source of current and responsive to the achieving of a condition of saturation in all of said reactor sections for applying current to the reset winding to drive the sections back to negative saturation in readiness for receipt of a new series of input pulses and for simultaneously applying a pulse to said output indicating that a predetermined number of input pulses have been registered.

5. In a magnetic counting and pulse forming circuit having an input for receiving input pulses and having an output, the combination which comprises, at least two saturable reactor sections having saturating winding means and reset winding means, a source of current, switching means interposed between the input and the saturating winding means for applying a current pulse of predetermined volt-second energy content to the reactor sections upon receipt of each of the input pulses, said reactor sections each being constructed of material having a substantially rectangular hysteresis loop, with the ampere-turns required to establish a given flux completely around one of the sections being so selected relative to the corresponding parameter of the other section that said one section is driven in successive steps from negative saturation toward positive saturation by the current pulses only after the other section has been so driven by said pulses, means including a switch connected to the source of current and responsive to the achieving of a condition of saturation in all of said reactor sections for applying current to the reset winding to cause all of the sections to be driven back to negative saturation in readiness for receipt of a new series of input pulses and for simultaneously applying a pulse to said output indicating that a predetermined number of input pulses have been registered.

6. In a magnetic counting and pulse forming circuit having an input for receiving input pulses and having an output, the combination which comprises, at least two saturable reactor sections having a saturating winding and a reset winding, a source of current, switching means interposed between the input and the saturating winding for applying a curent prulse of predetermined volt-second energy content to the reactor sections upon receipt of each of the input pulses, said reactor sections each being constructed of material having a substantially rectangular hysteresis loop, with the ampere-turns required to establish a given flux completely around one of the sections being so selected relative to the corresponding parameter of the other section that said one section is driven in successive steps from negative saturation toward positive saturation by the current pulses only after the other section has been so driven by said pulses, means including a switch connected to the source of current and responsive to the achieving of a condition of saturation in all of said reactor sections for applying current to the reset winding to cause all of the sections to be driven back to negative saturation in readiness for receipt of a new series of input pulses and for simultaneously applying a pulse to said output indicating that a predetermined number of input pulses have been registered.

7. In a magnetic counting and pulse forming circuit having an input for receiving input pulses and having an output, the combination which comprises, at least two saturable reactor sections having a saturating winding, a triggering winding, and a reset winding, a source of current, switching means interposed between the input and the saturating winding for applying a current pulse of predetermined volt-second energy content to the reactor sections upon receipt of each of the input pulses, said reactor sections each being constructed of material having a substantially rectangular hysteresis loop, with the ampere-turns required to establish a given flux completely around one of the sections being so selected relative to the corresponding parameter of the other section that said one section is driven in successive steps from negative saturation toward positive saturation by the current pulses only after the other section has been so driven by said pulses, means including a switch connected to the source of current and responsive to the inducement of a triggering voltage in the triggering winding by the collapse of flux following positive saturation of all the reactor sections for applying current to the reset winding to cause all of said sections to be driven back to negative saturation in readiness for receipt of a new series of input pulses and for simultaneously applying a pulse to said output indicating that a predetermined number of input pulses have been registered.

8. In a magnetic counting and pulse forming circuit having an input whereat input pulses are applied and an output, the combination which comprises, at least two saturable reactor sections constructed of materials having generally rectangular hysteresis loops and having a saturating winding and a reset winding, the ampere-turns required to establish a given flux completely around one of the sections being so proportioned relative to the corresponding parameters of the other section that the sections are driven from negative saturation states substantially to positive saturation states by the input pulses one after another, and means associated with the reset winding and rendered operative upon all sections attaining positive saturation states for applying a reset pulse to the reset winding to drive the sections back to negative saturation states, a pulse being provided at the output during reset which is indicative of a desired count.

9. In a magnetic counting and pulse forming circuit having an input whereat input pulses are applied and an output, the combination which comprises, a pair of saturable reactor cores constructed of materials having generally rectangular hysteresis loops and having a saturating winding and a reset winding, the ampere-turns required to establish a given flux completely around one of the cores being so proportioned relative to the corresponding parameter of the other core that said one core is driven from negative saturation in successive steps substantially to positive saturation by the input pulses before the input pulses so affect the other core, resetting means including a transistor connected to the reset winding and rendered operative upon both cores attaining positive saturation states for applying a reset pulse to the reset winding to drive the cores back to negative saturation states, and means responsive to the resetting of said cores for producing a pulse at the output indicative of a desired count.

10. In a magnetic counting and pulse forming circuit having an input whereat input pulses are applied and an output, the combination which comprises, a pair of saturable reactor cores constructed of materials having generally rectangular hysteresis loops and having a saturating winding and a reset winding, the ampere-turns required to establish a given flux completely around one of the cores being so proportioned relative to the corresponding parameter of the other core that said one core is driven from negative saturation in successive steps substantially to positive saturation by the input pulses before the input pulses so affect the other core, means connected to the reset winding and rendered operative by the collapse of excess flux following positive saturation of both cores for applying a reset pulse to the reset winding to cause both of said cores to be driven back to negative saturation states, and means responsive to the resetting of said cores for producing a pulse at the output indicative of a desired count.

11. In a magnetic counting and pulse forming circuit having an input whereat input pulses are applied and an output, the combination which comprises, a pair of saturable reactor cores constructed of materials having generally rectangular hysteresis loops and having a saturating winding, a triggering winding, and a reset winding, the ampere-turns required to establish a given flux completely around one of the cores, said one of the cores being so proportioned relative to the corresponding parameter of the other core that said one core is driven from negative saturation in successive steps substantially to positive saturation by the input pulses before the input pulses so affect the other core, means including a switching device coupled to the triggering and reset windings and responsive to the inducement of a voltage in the triggering winding by the collapse of excess flux following positive saturation of both cores for applying a reset pulse to the reset winding to cause both of the cores to be driven back to negative saturation states, and means responsive to the resetting of said cores for producing a pulse at the output indicative of a desired count.

12. In a magnetic counting and pulse forming circuit having an input whereat input pulses are applied and an output, the combination which comprises, a pair of saturable reactor cores constructed of materials having generally rectangular hysteresis loops and having a saturating winding coupled to said input and a reset winding, the number of ampere-turns required to establish a given flux completely around one of the cores being so proportioned relative to the corresponding parameter of the other core that said one core is driven from negative saturation in successive steps substantially to positive saturation by the input pulses before the input pulses so affect the other core, and means coupled to the reset winding and rendered operative upon both cores attaining positive saturation states for applying a reset pulse to the reset winding to cause the cores to be driven back to negative saturation states, and means responsive to the resetting of said cores for producing a pulse at the output indicative of a desired count.

13. In a magnetic counting and pulse forming circuit having an input whereat input pulses are applied and an output, the combination which comprises, at least two saturable reactor cores being constructed of materials having generally rectangular hysteresis loops and having a saturating winding and a reset winding, the number of ampere-turns required to establish a given flux completely around one of the cores being so proportioned relative to the corresponding parameters of another one of the cores that the cores are driven from negative saturation in successive steps substantially to positive saturation by the input pulses one after another, means coupled to the reset winding and rendered operative upon all cores attaining positive saturation states for applying a reset pulse to the reset winding to cause all of the cores to be driven back to negative saturation sates, and means responsive to the resetting of said cores for producing a pulse at the output indicative of a desired count.

14. In a magnetic counting and pulse forming circuit having an input whereat input pulses are applied and an output, the combination which comprises, a pair of saturable reactor cores constructed of materials having generally rectangular hysteresis loops and having a saturating winding coupled to said input and a reset winding, the magnetic field intensities of the cores being so proportioned relative to each other that one core is driven in successive steps from negative saturation substantially to positive saturation by the input pulses before the input pulses so affect the other core, means coupled to and means associated with the reset winding and rendered operative upon both cores attaining positive saturation states for applying a reset pulse to the reset winding to cause the cores to be driven back to negative saturation states, and means responsive to the resetting of said cores for producing a pulse at the output indicative of a desired count.

15. In a magnetic counting and pulse forming circuit having an input whereat input pulses are applied and an output, the combination which comprises, a pair of saturable reactor cores constructed of materials having generally rectangular hysteresis loops and having a saturating winding coupled to said input and a reset winding the number of ampere-turns required to establish a given flux completely around one of the cores being so proportioned relative to the corresponding parameter of the other core that said one core is driven in successive steps from negative saturation substantially to positive saturation by the input pulses before the input pulses so affect the other core, means coupled to the reset winding and rendered operative upon both cores attaining positive saturation states for applying a reset pulse to the reset winding to cause both said cores to be driven back to negative saturation states, and means responsive to the resetting of said cores for producing a pulse indicative of a desired count.

16. In a magnetic counting and pulse forming circuit having an input whereat input pulses are applied and an output, the combination which comprises, at least two saturable reactor cores being constructed of materials having generally rectangular hysteresis loops and having a saturating winding and a reset winding, the number of ampere-turns required to establish a given flux completely around one of the cores being so proportioned relative to the corresponding parameter of another one of the cores that the cores are driven in successive steps from negative saturation states substantially to positive saturation states by the input pulses one after another, means coupled to the reset winding and rendered operative upon all cores attaining positive saturation states for applying a reset pulse to the reset winding to cause the cores to be driven back to negative saturation states, and means responsive to the resetting of said cores for producing a pulse at the output indicative of a desired count.

17. In a magnetic counting and pulse forming circuit having an input whereat input pulses are applied and an output, the combination which comprises, a pair of identical saturable reactor cores constructed of materials having generally rectangular hysteresis loops and linked by a saturating winding coupled to said input and a reset winding, the number of saturating winding turns linking the respective cores being so proportioned relative to each other that one core is driven in successive steps from negative saturation substantially to positive saturation by the input pulses before the input pulses so affect the other core, means coupled to the reset winding and rendered operative upon both cores attaining positive saturation states for applying a reset pulse to the reset winding to cause both of the cores to be driven back to negative saturation states, and means responsive to the resetting of said cores for producing a pulse at the output indicative of a desired count.

18. In a magnetic counting and pulse forming circuit having an input whereat pulses are applied and an output, the combination which comprises, a pair of saturable reactor cores constructed of materials having generally rectangular hysteresis loops and having a saturating winding coupled to said input and a reset winding, the cores being constructed of different materials having different magnetic characteristics so proportioned between the cores that one core is driven step by step from negative saturation substantially to positive saturation by the input pulses before the input pulses so affect the other core, means coupled to the reset winding and rendered operative upon both cores attaining positive saturation states for applying a reset pulse to the reset winding to cause both of the cores to be driven back to negative saturation states, end means responsive to the resetting of said cores for producing a pulse at the output indicative of a desired count.

19. In a magnetic counting and pulse forming circuit having an input whereat input pulses are applied and an output, the combination which comprises, a pair of saturable reactor cores constructed of materials having generally rectangular hysteresis loops and having a saturating winding coupled to said input and a reset winding, the cores having unequal mean magnetic lengths so proportioned that one core is driven step by step from negative saturation substantially to positive saturation by the input pulses before the input pulses so affect the other core, means coupled to the reset winding and rendered operative upon both cores attaining positive saturation states for applying a reset pulse to the reset winding to cause both of the cores to be driven back to negative saturation states, and means responsive to the resetting of said cores for producing a pulse at the output indicative of a desired count.

20. In a magnetic counting and pulse forming circuit having an input whereat input pulses are applied and an output, the combination which comprises, a pair of saturable reactor cores constructed of materials having generally rectangular hysteresis loops and having a saturating winding coupled to said input and a reset winding, the cross-sectional area of one of said cores being so proportioned relative to the cross-sectional area of the other core that said one core is driven step by step from negative saturation substantially to positive saturation by the input pulses before the input pulses so affect the other core, means coupled to the reset winding and rendered operative upon both cores attaining positive saturation states for applying a reset pulse to the reset winding to cause both of the cores to be driven back to negative saturation states, and means responsive to the resetting of said cores for producing a pulse at the output indicative of a desired count.

21. In a magnetic counting and pulse forming circuit having an input whereat input pulses are applied and an output, the combination which comprises, a saturable reactor core having a pair of sections constructed of a material having a generally rectangular hysteresis loop and having a saturating winding coupled to said input and a reset winding, the cross-sectional area and the mean magnetic length of one section being so proportioned relative to the corresponding parameters of the other section that said one section is driven step by step from negative saturation substantially to positive saturation by the input pulses before the input pulses so affect the other section, means coupled to the reset winding and rendered operative upon both sections attaining positive saturation states for applying a reset pulse to the reset winding to cause both of the sections to be driven back to negative saturation states, and means responsive to the resetting of said cores for producing a pulse at the output indicative of a desired count.

References Cited by the Examiner

UNITED STATES PATENTS 3,007,142 10/1961 An Wang ---------- 340—174

BERNARD KONICK, *Primary Examiner.*

S. M. URYNOWICZ, *Assistant Examiner.*